US012676264B2

(12) United States Patent
Park

(10) Patent No.: US 12,676,264 B2
(45) Date of Patent: Jul. 7, 2026

(54) MULTILAYER ELECTRONIC COMPONENT

(71) Applicant: SAMSUNG ELECTRO-MECHANICS CO., LTD., Suwon-si (KR)

(72) Inventor: Yang-Seok Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 207 days.

(21) Appl. No.: 18/220,935

(22) Filed: Jul. 12, 2023

(65) Prior Publication Data

US 2024/0062966 A1    Feb. 22, 2024

(30) Foreign Application Priority Data

Aug. 22, 2022    (KR) .......................... 10-2022-0104589

(51) Int. Cl.
*H01G 4/30*      (2006.01)
*H01G 4/232*     (2006.01)

(52) U.S. Cl.
CPC ............. *H01G 4/30* (2013.01); *H01G 4/2325* (2013.01)

(58) Field of Classification Search
CPC .......... H01G 4/30; H01G 4/2325; H01G 4/12; H01G 4/1218; H01G 4/1227; H01G 4/224; H01G 4/232; H01G 4/40; H01G 4/012; H01G 4/248
See application file for complete search history.

(56) References Cited

U.S. PATENT DOCUMENTS

| | | | | |
|---|---|---|---|---|
| 7,864,505 | B1 * | 1/2011 | O'Brien ................. | H01G 4/203 |
| | | | | 361/311 |
| 9,190,217 | B2 * | 11/2015 | Snyder ..................... | H01G 9/15 |
| 2020/0035415 | A1 | 1/2020 | Kwon et al. | |
| 2020/0035416 | A1 * | 1/2020 | Kwon ...................... | H01G 4/30 |
| 2020/0181028 | A1 * | 6/2020 | Wang .................... | H01G 4/012 |
| 2021/0005390 | A1 | 1/2021 | Lee et al. | |
| 2021/0090808 | A1 * | 3/2021 | Jeong ..................... | H01G 4/224 |

FOREIGN PATENT DOCUMENTS

| | | |
|---|---|---|
| KR | 10-2016-0107535 A | 9/2016 |
| KR | 10-2019-0116128 A | 10/2019 |
| KR | 10-2019-0121132 A | 10/2019 |
| KR | 10-2022-0037136 A | 3/2022 |

OTHER PUBLICATIONS

Office Action issued on Mar. 19, 2026 in corresponding Korean Patent Application No. 10-2022-0104589 with English translation.

* cited by examiner

*Primary Examiner* — Timothy J. Dole
*Assistant Examiner* — Esther N Lian
(74) *Attorney, Agent, or Firm* — Morgan, Lewis & Bockius LLP

(57) ABSTRACT

A multilayer electronic component includes a body having a dielectric layer and internal electrodes stacked in a first direction with the dielectric layer interposed therebetween, and an external electrode disposed on the body in a second direction perpendicular to the first direction and connected to the internal electrodes. The body includes an active portion including the internal electrodes to form capacitance and cover portions disposed on both end surfaces of the active portion in the first direction, and the cover portion includes a ceramic wire. The ceramic wire includes at least one or more groups arranged in one direction.

23 Claims, 8 Drawing Sheets

FIRST
DIRECTION

SECOND
DIRECTION

THIRD
DIRECTION

FIRST
DIRECTION

SECOND
DIRECTION

I-I'

II-II'

FIRST
DIRECTION

THIRD
DIRECTION

MULTILAYER ELECTRONIC COMPONENT

CROSS-REFERENCE TO RELATED APPLICATION(S)

This application claims benefit of priority to Korean Patent Application No. 10-2022-0104589 filed on Aug. 22, 2022 in the Korean Intellectual Property Office, the disclosure of which is incorporated herein by reference in its entirety.

TECHNICAL FIELD

The present disclosure relates to a multilayer electronic component.

A Multilayer Ceramic Capacitor (MLCC), a multilayer electronic component, is a chip-type capacitor serving to charge or discharge electricity by being mounted on the printed circuit boards of various electronic products such as video devices such as liquid crystal displays (LCDs) and plasma display panels (PDPs), computers, smartphones, and mobile phones.

Such a multilayer ceramic capacitor may be used as a component of various electronic devices due to the small size, high capacitance, and ease of mounting thereof. As various electronic devices such as computers and mobile devices are miniaturized and become more highly-powered, demand for miniaturization and high capacity multilayer ceramic capacitors is increasing.

Recently, as demand for MLCCs for automotive electronics has rapidly increased, multilayer electronic components having excellent reliability even in high heat or external impacts are required. In detail, as technology develops, high voltage products are required. To manufacture such products, it is essential to develop high withstand voltage characteristics. Therefore, it is necessary to have excellent mechanical properties to withstand chip expansion and contraction due to the electrostriction effect (inverse piezoelectric effect), as well as vibrations and shocks caused by the external environment.

In the related art, to reduce the crack problem caused by chip deformation by voltage, it is tried to prevent the problem by changing the design, such as the thickness of the dielectric layer of the MLCC, the thickness of the cover and margin, and the shape of the chip, but there is a possibility of accompanying unexpected side effects in case of design change. In addition, as the reliability, capacitance, and miniaturization of progressively advanced technology are required, the need to reduce the volume of the cover portion and the margin portion has emerged, but in this case, a problem of insufficient capacity occurs due to a reduction in the capacitance forming area, which reduces reliability and mechanical strength.

SUMMARY

An aspect of the present disclosure is to provide a multilayer electronic component that is resistant to bending stress or external impact due to the electrostrictive effect.

An aspect of the present disclosure is to provide a multilayer electronic component suppressing cracks or delamination from occurring.

An aspect of the present disclosure is to provide a multilayer electronic component having improved mechanical properties.

According to an aspect of the present disclosure, a multilayer electronic component includes a body having a dielectric layer and internal electrodes stacked in a first direction with the dielectric layer interposed therebetween; and an external electrode disposed on the body in a second direction perpendicular to the first direction and connected to the internal electrodes. The body includes an active portion including the internal electrodes to form capacitance and cover portions disposed on both end surfaces of the active portion in the first direction, and at least one of the cover portions include ceramic wires. The ceramic wires include at least one groups of the ceramic wires arranged in one direction.

According to an aspect of the present disclosure, a multilayer electronic component includes a body having a dielectric layer and internal electrodes stacked in a first direction with the dielectric layer interposed therebetween; and an external electrode disposed on the body in a second direction perpendicular to the first direction and connected to the internal electrodes. The body includes an active portion including the internal electrodes to form capacitance and a margin portion disposed on both end surfaces of the active portion in a third direction perpendicular to the first and second directions, and the margin portion includes ceramic wires. The ceramic wires include at least one group of the ceramic wires arranged in one direction.

According to an aspect of the present disclosure, a multilayer electronic component includes a body having a dielectric layer and internal electrodes stacked in a first direction with the dielectric layer interposed therebetween; and an external electrode disposed on the body in a second direction perpendicular to the first direction and connected to the internal electrodes. The body includes an active portion including the internal electrodes to form capacitance and a margin portion disposed on both end surfaces of the active portion in a third direction perpendicular to the first and second directions, and the margin portion includes at least one ceramic wire.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
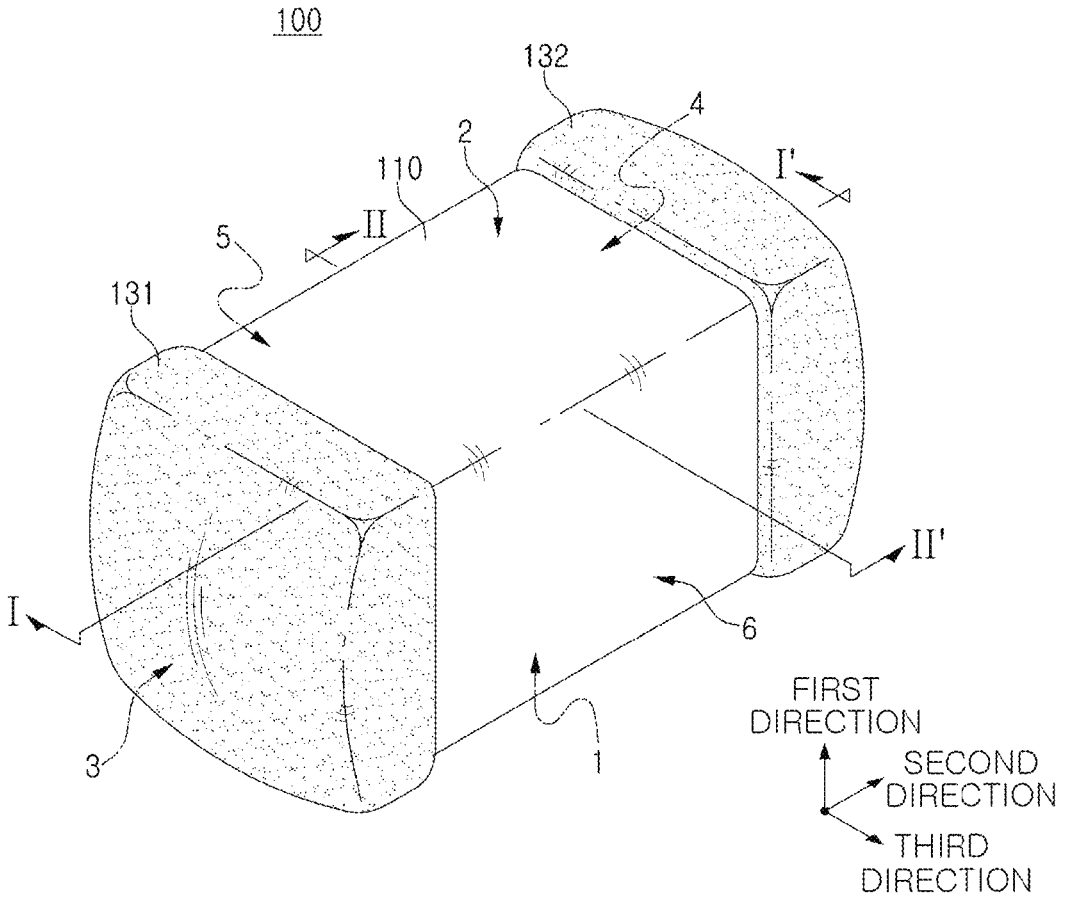
FIG. 1 schematically illustrates a perspective view of a multilayer electronic component according to an embodiment.

Hereinafter, embodiments of the present disclosure will be described with reference to specific embodiments and accompanying drawings. However, the embodiments of the present disclosure may be modified in many different forms, and the scope of the present disclosure is not limited to the embodiments described below. In addition, the embodiments of the present disclosure are provided to more completely describe the present disclosure to those skilled in the art. Therefore, the shape and size of elements in the drawings may be exaggerated for clearer explanation, and elements indicated by the same reference numerals in the drawings are the same elements.

In addition, to clearly describe the present disclosure in the drawings, parts irrelevant to the description are omitted, and the size and thickness of each component illustrated in the drawings are arbitrarily illustrated for convenience of description, and thus, the present disclosure is not necessarily limited to the illustrated. Also, components having the same function within the scope of the same concept are described using the same reference numerals. Furthermore, throughout the specification, when a certain component is said to "include," it means that it may further include other components without excluding other components unless otherwise stated.

In the drawing, the first direction may be defined as the stacking direction or the thickness (T) direction, the second direction may be defined as the length (L) direction, and the third direction may be defined as the width (W) direction.

Multilayer Electronic Component

FIG. 1 schematically illustrates a perspective view of a multilayer electronic component according to an embodiment.

Figure 2:
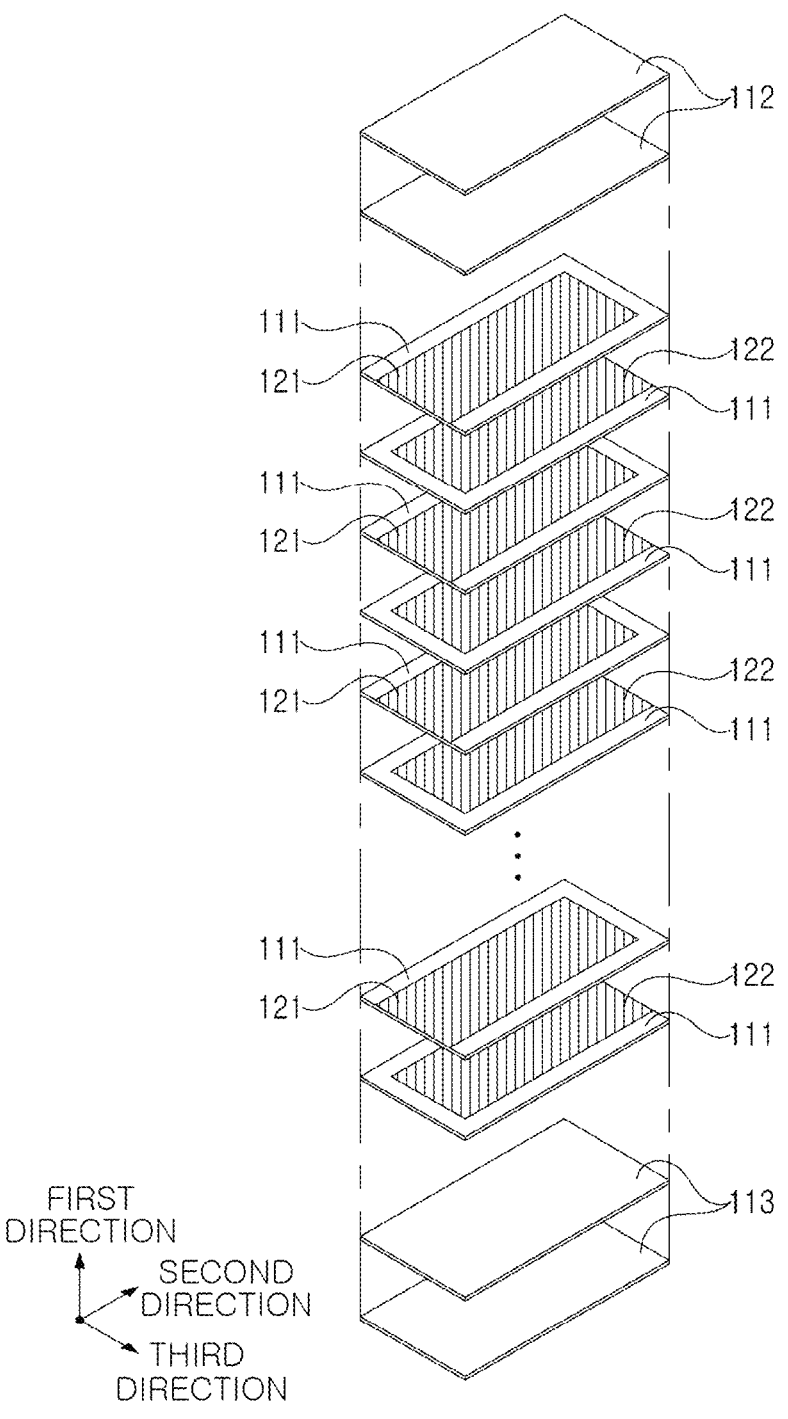
FIG. 2 schematically illustrates an exploded view of a body of a multilayer electronic component according to an embodiment.

FIG. 2 schematically illustrates an exploded view of a body of a multilayer electronic component according to an embodiment.

Figure 3:
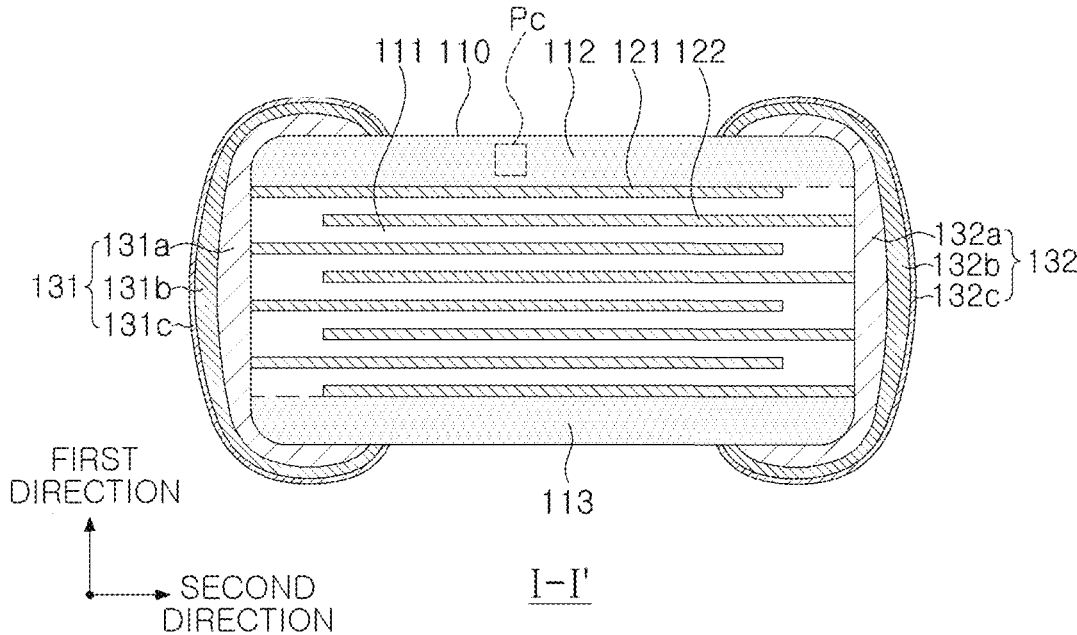
FIG. 3 schematically illustrates a cross-sectional view taken along line I-I' of FIG. 1.

FIG. 3 schematically illustrates a cross-sectional view taken along line I-I' of FIG. 1.

Figure 4:
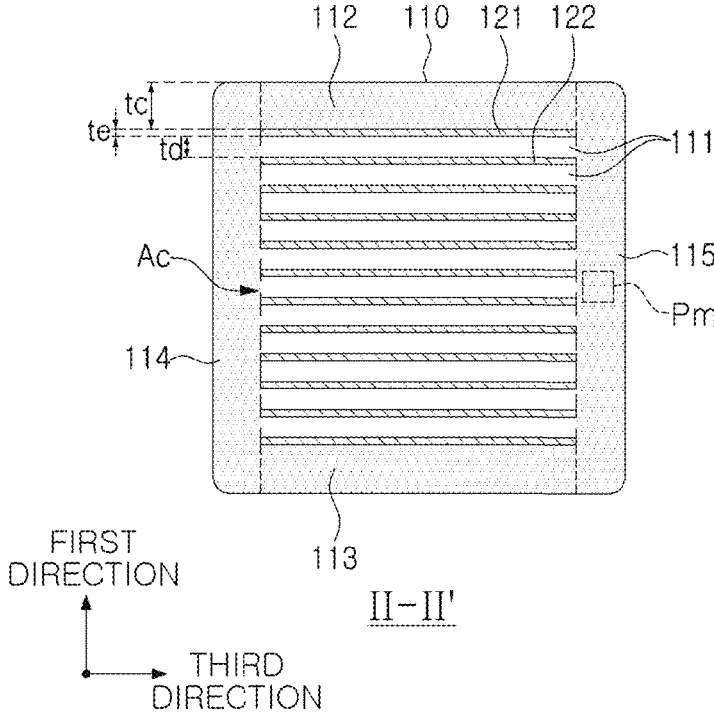
FIG. 4 schematically illustrates a cross-sectional view taken along line II-II' of FIG. 1.

FIG. 4 schematically illustrates a cross-sectional view taken along line II-II' of FIG. 1.

Figures 5A, 5B, 5C:
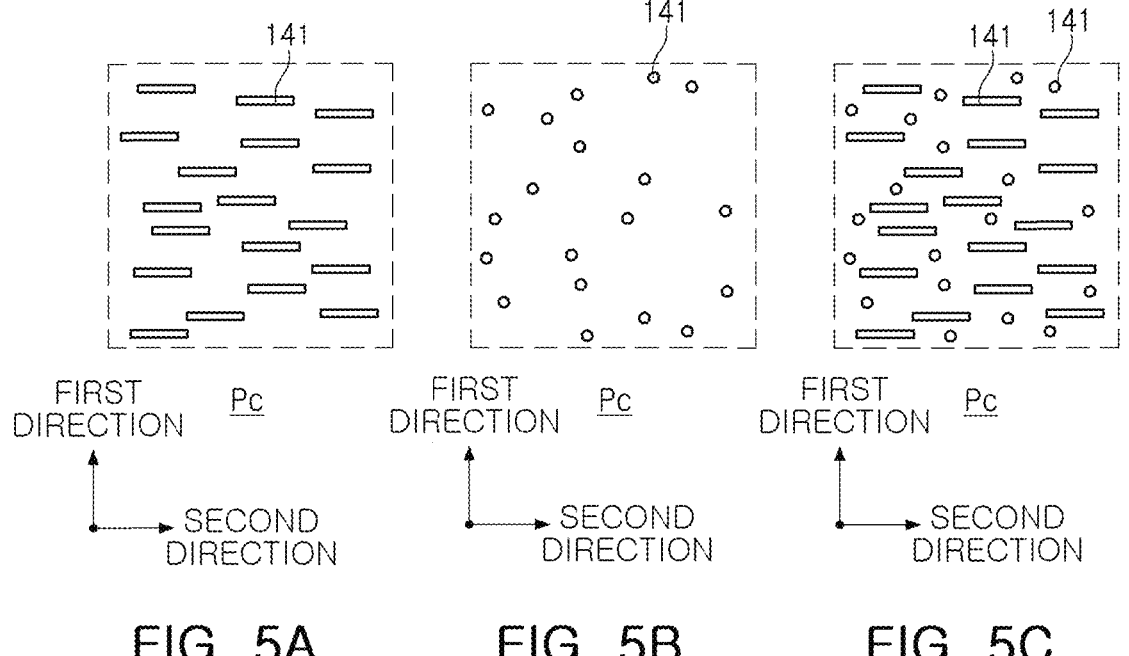
FIGS. 5A to 5C schematically illustrates various embodiments of the present disclosure in which the Pc region of FIG. 3 is enlarged.

FIGS. 5A to 5C schematically illustrates various embodiments of the present disclosure in which the Pc region of FIG. 3 is enlarged.

Figures 6A, 6B, 6C:
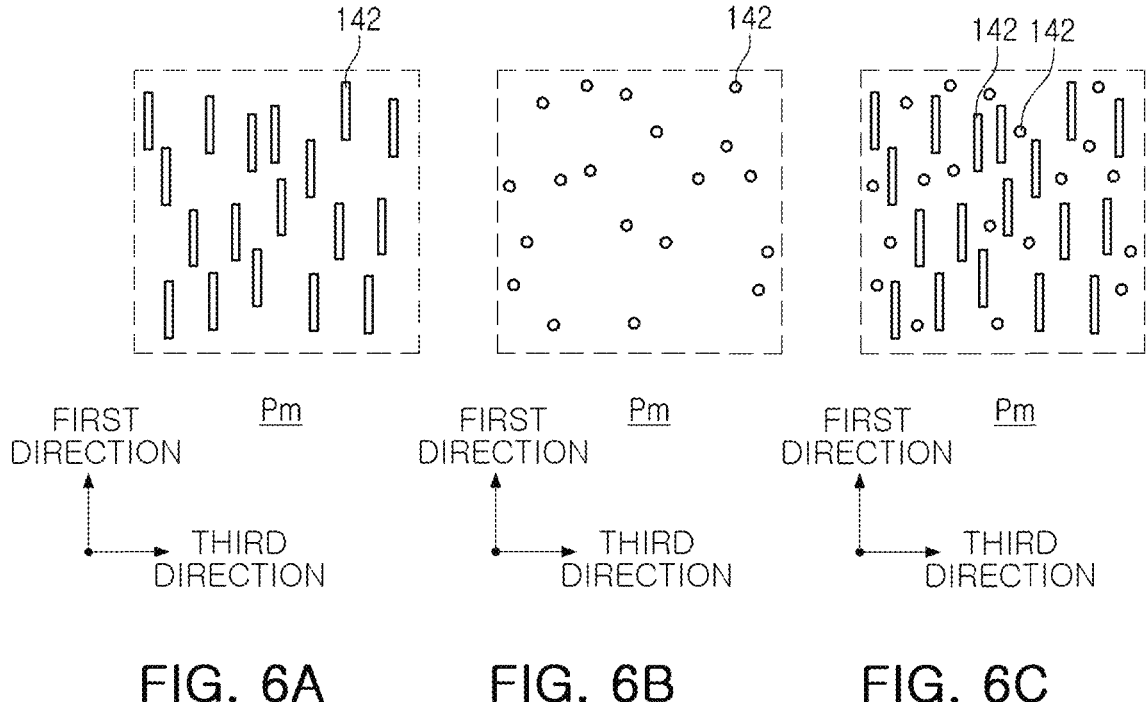
FIGS. 6A to 6C schematically illustrates various embodiments of the present disclosure in which the Pm region of FIG. 4 is enlarged.

FIGS. 6A to 6C schematically illustrates various embodiments of the present disclosure in which the Pm region of FIG. 4 is enlarged.

Figure 7:
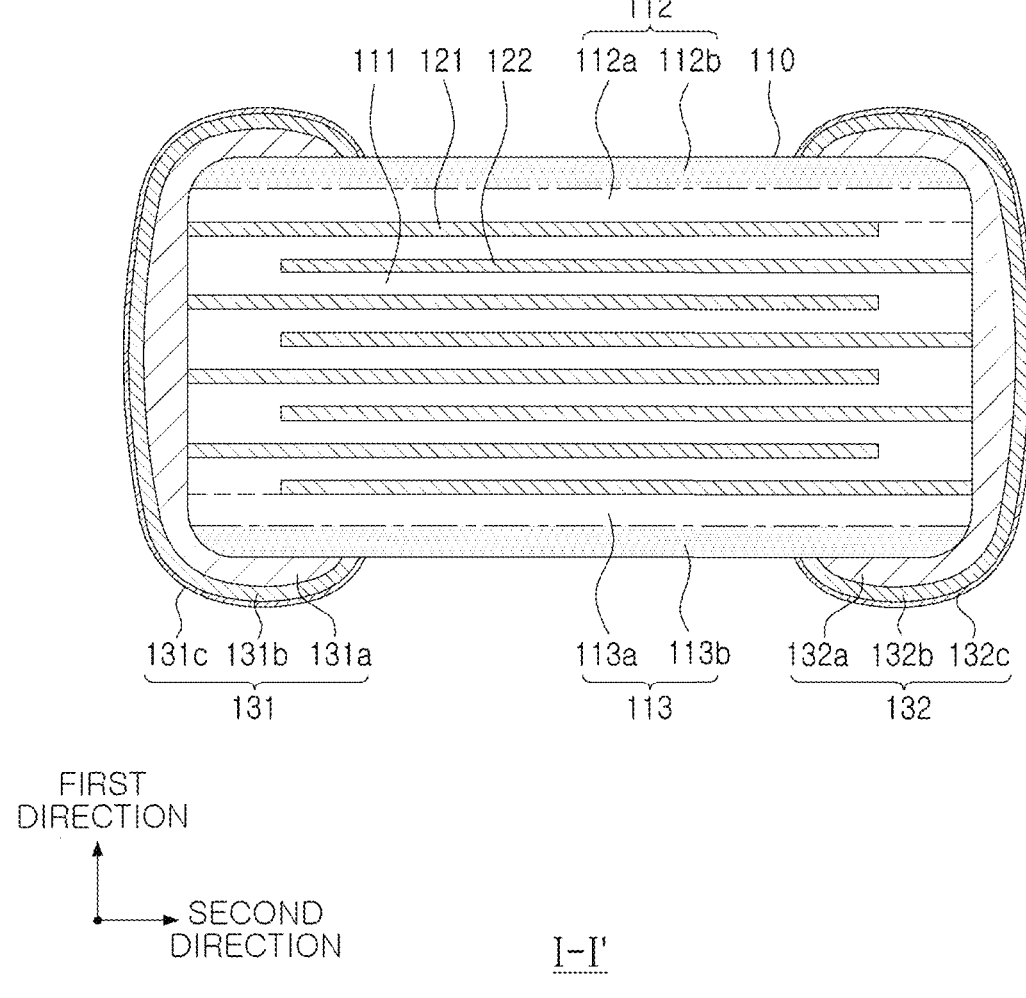
FIG. 7 schematically illustrates a cross-sectional view taken along line I-I' of FIG. 1 according to an embodiment.

FIG. 7 schematically illustrates a cross-sectional view taken along line I-I' of FIG. 1 according to an embodiment.

Figure 8:
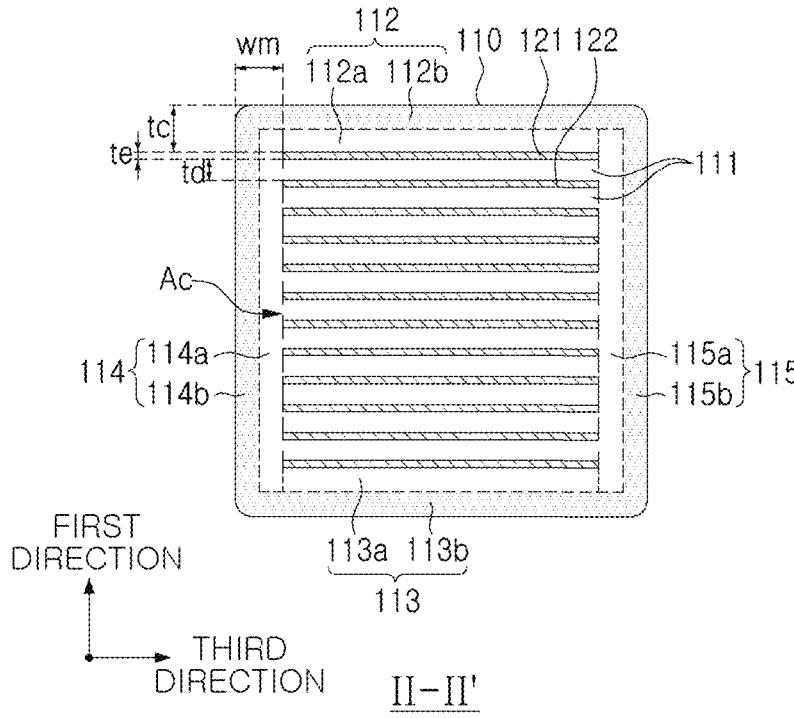
FIG. 8 schematically illustrates a cross-sectional view taken along line II-II' of FIG. 1 according to an embodiment.

FIG. 8 schematically illustrates a cross-sectional view taken along line II-II' of FIG. 1 according to an embodiment.

Hereinafter, referring to FIGS. 1 to 8, a multilayer electronic component according to an embodiment will be described in detail. However, although a multilayer ceramic capacitor is described as an example of a multilayer electronic component, the present disclosure may be applied to various electronic products using a dielectric composition, such as inductors, piezoelectric elements, varistors, or thermistors.

A multilayer electronic component 100 according to an embodiment includes a body 110 including a dielectric layer 111 and internal electrodes 121 and 122 stacked in a first direction with the dielectric layer 111 interposed therebetween; and external electrodes 131 and 132 disposed on the body 110 in a second direction perpendicular to the first direction and connected to the internal electrodes 121 and 122. The body 110 includes an active portion Ac including the internal electrodes 121 and 122 to form capacitance, and cover portions 112 and 113 disposed on both end surfaces of the active portion Ac in the first direction. The cover portions

112 and 113 include ceramic wires 141, and the ceramic wires 141 include at least one group arranged in one direction.

In the body 110, the dielectric layers 111 and the internal electrodes 121 and 122 are alternately stacked.

In detail, the body 110 may include the active portion Ac that is disposed inside the body 110 and forms capacitance by including the first internal electrodes 121 and the second internal electrodes 122 alternately disposed to face each other with the dielectric layer 111 interposed therebetween.

Although the specific shape of the body 110 is not particularly limited, as illustrated, the body 110 may have a hexahedral shape or a shape similar thereto. Due to shrinkage of the ceramic powder included in the body 110 during firing, the body 110 may have a substantially hexahedral shape, although it does not have a perfectly straight hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3 and 4 and opposing each other in the third direction.

The plurality of dielectric layers 111 forming the body 110 are in a sintered state, and the boundary between adjacent dielectric layers 111 may be unified to the extent that it is difficult to confirm without using a scanning electron microscope (SEM).

The raw material forming the dielectric layer 111 is not limited as long as sufficient capacitance may be obtained. In general, a perovskite ($ABO_3$)-based material may be used, and for example, a barium titanate-based material, a lead composite perovskite-based material, a strontium titanate-based material or the like may be used. The barium titanate-based material may include $BaTiO_3$-based ceramic powder. As an example of the ceramic powder, $BaTiO_3$, or $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$) or $Ba(Ti_{1-y}Zr_y)O_3$ ($0<y<1$) in which calcium (Ca), zirconium (Zr) or the like is partially solid-solubilized in $BaTiO_3$, may be provided.

In addition, various ceramic additives, organic solvents, binders, dispersants, and the like may be added to powder such as barium titanate ($BaTiO_3$), as a raw material forming the dielectric layer 111 according to the usage of the present disclosure. In some embodiments, the dielectric layer 111 may be free of ceramic wire.

The thickness td of the dielectric layer 111 does not need to be particularly limited.

However, to more easily obtain miniaturization and high capacity of the multilayer electronic component, the thickness of the dielectric layer 111 may be 0.6 μm or less, in detail, 0.4 μm or less.

In this case, the thickness td of the dielectric layer 111 may indicate the thickness td of the dielectric layer 111 disposed between the first and second internal electrodes 121 and 122.

On the other hand, the thickness td of the dielectric layer 111 may refer to the size of the dielectric layer 111 in the first direction. Also, the thickness td of the dielectric layer 111 may indicate the average thickness td of the dielectric layer 111 and may refer to the average size of the dielectric layer 111 in the first direction.

The average size of the dielectric layer 111 in the first direction may be measured by scanning the image of the cross-section of the body 110 in the first and second directions with a scanning electron microscope (SEM) at a magnification of 10,000, and in detail, may be an average value obtained by measuring the size of one dielectric layer 111 in the first direction at 30 equally spaced points in the second direction in the scanned image. The 30 equally spaced points may be designated in the active portion Ac. In addition, if the average value is measured by extending the average value measurement to 10 dielectric layers 111, the average size of the dielectric layers 111 in the first direction may be further generalized. Other methods and/or tools appreciated by one of ordinary skill in the art, even if not described in the present disclosure, may also be used.

The internal electrodes 121 and 122 may be alternately stacked with the dielectric layer 111.

The internal electrodes 121 and 122 may include a first internal electrode 121 and a second internal electrode 122, and the first and second internal electrodes 121 and 122 are alternately disposed to face each other with the dielectric layers 111 interposed therebetween, constituting the body 110, and may be exposed to the third and fourth surfaces 3 and 4 of the body 110, respectively.

In detail, the first internal electrode 121 may be spaced apart from the fourth surface 4 and exposed through the third surface 3, and the second internal electrode 122 may be spaced apart from the third surface 3, and may be exposed through the fourth surface 4. A first external electrode 131 is disposed on the third surface 3 of the body 110 and connected to the first internal electrode 121, and a second external electrode 132 may be disposed on the fourth surface 4 of the body 110 and connected to the second internal electrode 122.

For example, the first internal electrode 121 is connected to the first external electrode 131 without being connected to the second external electrode 132, and the second internal electrode 122 may be connected to the second external electrode 132 without being connected to the first external electrode 131. In this case, the first and second internal electrodes 121 and 122 may be electrically separated from each other by the dielectric layer 111 disposed therebetween.

On the other hand, the body 110 may be formed by alternately stacking ceramic green sheets on which the first internal electrodes 121 are printed and ceramic green sheets on which the second internal electrodes 122 are printed, and then firing the same.

The material forming the internal electrodes 121 and 122 is not particularly limited, and a material having relatively excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes, containing at least one of nickel (Ni), copper (Cu), palladium (Pd), silver (Ag), gold (Au), platinum (Pt), tin (Sn), tungsten (W), titanium (Ti) and alloys thereof, on a ceramic green sheet. A screen-printing method or a gravure printing method may be used as a method of printing the conductive paste for the internal electrode, but the present disclosure is not limited thereto.

On the other hand, the thickness te of the internal electrodes 121 and 122 does not need to be particularly limited.

However, to more easily obtain miniaturization and high capacity of the multilayer electronic component, the thickness te of the internal electrodes 121 and 122 may be 0.6 μm or less, in detail, 0.4 μm or less.

In this case, the thickness te of the internal electrodes 121 and 122 may indicate the size of the internal electrodes 121 and 122 in the first direction. In addition, the thickness te of the internal electrodes 121 and 122 may indicate the average thickness te of the internal electrodes 121 and 122, and may indicate the average size of the internal electrodes 121 and 122 in the first direction.

The average size of the internal electrodes 121 and 122 in the first direction may be measured by scanning an image of the cross-section of the body 110 in the first and second directions with a scanning electron microscope (SEM) at a magnification of 10,000, and in detail, may be an average value obtained by measuring the size of one internal electrode 121 or 122 in the first direction at 30 equally spaced points in the second direction in the scanned image. The 30 equally spaced points may be designated in the active portion Ac. In addition, if the average value is measured by extending the average value measurement to 10 internal electrodes 121 and 122, the average size of the internal electrodes 121 and 122 in the first direction may be further generalized. Other methods and/or tools appreciated by one of ordinary skill in the art, even if not described in the present disclosure, may also be used.

In recent years, as demand for MLCCs for automotive electronics has rapidly increased, multilayer electronic components having excellent reliability even in high heat or in the case of an external impact are required. In detail, as technology develops, high voltage products are required. To manufacture such products, it is essential to develop high withstand voltage characteristics. Therefore, it is necessary to have excellent mechanical properties to withstand vibrations and shocks caused by the external environment, as well as chip expansion and contraction due to the electrostrictive effect (inverse piezoelectric effect).

In the related art, in order to reduce the crack problem caused by chip deformation by voltage, it is tried to prevent the problem by changing the design of the MLCC's dielectric layer thickness, cover and margin thicknesses, a chip shape, or the like, but there is a possibility of accompanying unexpected side effects in the case of design changes. In addition, as reliability, capacitance, and miniaturization are gradually improved, the need to reduce the volume of the cover portion and the margin portion has emerged, but in this case, a problem of insufficient capacity occurs due to a decrease in a capacitance formation area in which reliability and mechanical strength are lowered.

In an embodiment of the present disclosure, by including ceramic wires 141 and 142 including ceramic microwires or ceramic nanowires in the cover portions 112 and 113 or the margin portions 114 and 115, even if external impact or bending stress due to electrostrictive effect is applied to the chip, which is a multilayer electronic component, excellent mechanical properties may be exerted, which will be described in more detail below.

The body 110 may include cover portions 112 and 113 disposed on both end-surfaces of the active portion Ac in the first direction.

In detail, the body 110 may include an upper cover portion 112 disposed on the active portion Ac in the first direction, and a lower cover portion 113 disposed below the active portion Ac in the first direction.

The upper cover portion 112 and the lower cover portion 113 may be formed by stacking a single dielectric layer 111 or two or more dielectric layers 111 on the upper and lower surfaces of the active portion Ac in a first direction, respectively, and may serve to prevent damage to the internal electrodes 121 and 122 due to physical or chemical stress.

The upper cover portion 112 and the lower cover portion 113 may not include the internal electrodes 121 and 122 and may include the same material as the dielectric layer 111. For example, the upper cover portion 112 and the lower cover portion 113 may include a ceramic material, for example, a barium titanate (BaTiO$_3$)-based ceramic material.

In an embodiment, the cover portions 112 and 113 may include the ceramic wire 141.

The ceramic wire 141 included in the cover portions 112 and 113 may mean a ceramic material having a wire shape, and for example, the ceramic material may include at least one selected from SiC, TiC, TiO$_2$, BaTiO$_3$, ZnO, Al$_2$O$_3$, and fiberglass, but the present disclosure is not limited thereto.

The ceramic wires 141 and 142 have relatively excellent heat resistance and strength characteristics, and thus may have excellent mechanical characteristics even at high temperatures. Accordingly, even if the ceramic wires 141 and 142 are included during the manufacturing process for forming the cover portions 112 and 113 or the margin portions 114 and 115 and then the firing process is performed, the ceramic wires may remain in the form of a wire in the final product, a chip, and malignant residual carbon due to characteristics of ceramics is not generated. In addition, there is little heterogeneity with BaTiO$_3$, which is a ceramic dielectric composition that may be used as the main component of the cover portions 112 and 113 or the margin portions 114 and 115, without deteriorating mechanical properties, and reliability may be improved by suppressing generation of pores and the like.

In an embodiment, the ceramic wire 141 may include at least one of ceramic microwires and ceramic nanowires.

In this case, the microwire may be defined as a material having a wire shape in which a diameter is 1 μm or more and 100 μm or less and a length is 1 μm or more and 1000 μm or less and the length is greater than the diameter, but the present disclosure is not limited thereto. For example, the microwire may refer to a generally defined material having a micrometric wire shape.

A nanowire may be defined as a material having a wire shape having a diameter of 1 nm or more and 100 nm or less, a length of 1 nm or more and 1000 nm or less, and a length greater than the diameter, but the present disclosure is not limited thereto. For example, the nanowire may indicate a generally defined material having a nanometric wire shape.

In detail, the ceramic wires 141 may be included in the cover portions 112 and 113 by including or mixing ceramic microwires or ceramic nanowires therein, respectively. The ceramic wires 141 dispersed in the cover portions 112 and 113 may play a reinforcing role by supporting the dielectric layer included in the cover portions 112 and 113.

As a result, mechanical strength may be improved, and there may be provided resistance against occurrence of defects such as electrostrictive cracks that may occur due to chip deformation due to electrostriction effect caused by voltage application, radiation cracks due to expansion of internal electrodes, and chip deformation or cracks due to external impact or the like, and therefore, moisture resistance reliability may also be improved.

As a result, as the mechanical properties of the multilayer electronic component 100 are improved, the volume of the cover portions 112 and 113 is reduced compared to the multilayer electronic component of the related art, and the area of the active portion Ac for forming capacitance is expanded and designed to increase electrical characteristics or obtain miniaturization.

In an embodiment, the ceramic wires 141 included in the cover portions 112 and 113 may include at least one group arranged in one direction.

In an embodiment, a group of ceramic wires 141 arranged in one direction may indicate that the ratio of the ceramic wires 141 arranged in one direction relative to the total ceramic wires 141 included in the cover portions 112 and 113 is 30% or more.

In detail, the group of ceramic wires 141 arranged in one direction may indicate that the ratio of the number of the ceramic wires 141 arranged in one direction on the upper cover portion 112 to the total number of ceramic wires 141 included in the upper cover portion 112 is 30% or more, and may indicate that the ratio of the number of the ceramic wires 141 arranged in one direction in the lower cover portion 113 to the total number of ceramic wires 141 included in the cover portion 113 is 30% or more.

On the other hand, the direction of the ceramic wires 141 and 142 described herein may refer to a direction in which a virtual line connecting both ends of a long axis (longitudinal direction) of one ceramic wire 141 or 142 is directed, and for example, may refer to a virtual line connecting the center of the minor axis (diameter) of one end of the ceramic wire 141, 142 and the center of the minor axis (diameter) of the other end.

Alternatively, the direction of the ceramic wires 141 and 142 may indicate a direction in which the ceramic wires 141 and 142 form a substantially straight line toward any one direction, indicate that a direction in which the ceramic wires are arranged in a substantially constant direction for more than 50% of the long axis length of the ceramic wires 141 and 142, in detail, for more than 70%, in more detail, for more than 90%.

Mechanical properties may be improved by randomly arranging the ceramic wires 141 distributed in the cover portions 112 and 113, but when the ceramic wires 141 are arranged in a specific direction, possible defects may be more effectively suppressed.

The case of constantly arranging in a specific direction includes, for example, a case in which all of the plurality of ceramic wires 141 are constantly arranging in one direction, a case including one group arranging in one direction and another group arranging in another direction, or a case in which a plurality of groups in which the arrangement directions are not the same.

On the other hand, as a method of arranging the ceramic wires 141, a doctor blade method or the like may be used, but the present disclosure is not limited thereto.

In detail, as described above, the cover portions 112 and 113 may be formed by laminating, in the first direction, one dielectric layer 111 or two or more dielectric layers 111 on both end-surfaces of the active portion Ac in the first direction. In this case, when preparing a slurry for forming the dielectric layer 111, the ceramic wire 141 may be added. Thereafter, a slurry may be applied on a film and a dielectric green sheet having a uniform thickness may be formed using a doctor blade method or the like. At this time, the ceramic wires 141 may be controlled to be arranged in a certain direction by adjusting the moving speed of the film, the concentration of the slurry, the number of ceramic wires, the thickness of the dielectric green sheet using a doctor blade, or the like, which may refer to being arranged in a specific direction by external shear stress.

As the dielectric green sheets including the ceramic wires 141 arranged in a specific direction are stacked in different directions using the above method, the cover portions 112 and 113 including the ceramic wires 141 arranged in different directions are stacked may be formed.

In an embodiment, the ceramic wires 141 may include one group arranged in one direction and another group arranged in another direction.

Referring to FIGS. 5A to 5C, which are embodiments of the present disclosure, the ceramic wires 141 included in the cover portions 112 and 113 may be arranged in a second direction or a third direction.

For example, one group arranged in one direction may be arranged in a second direction, and another group arranged in another direction may be arranged in a third direction.

The electrostrictive effect caused by voltage application may generally occur in the first direction of the internal electrodes 121 and 122, and thus, bending stress may be applied to the cover portions 112 and 113 in the first direction. In this case, when the ceramic wires 141 included in the cover portions 112 and 113 are arranged in a second direction or a third direction perpendicular to the first direction, bending stress applied to the cover portions 112 and 113 due to an electrostrictive effect may be effectively suppressed, and occurrence of cracks, delamination, or acoustic noise may be prevented.

In detail, when the ceramic wires 141 are arranged in the second direction, bending stress in the first direction may be suppressed, and when the multilayer electronic component 100 is stretched or contracted in the second direction, mechanical characteristics may be enhanced.

When the ceramic wires 141 are arranged in the third direction, bending stress in the first direction may be suppressed, and mechanical properties may be reinforced when the multilayer electronic component 100 is stretched or contracted in the third direction.

In the case of the ceramic wire 141 included in the cover portions 112 and 113, by scanning an image of a cross-section of the body 110 in the first and second directions or in the first and third directions with a scanning electron microscope (SEM) or a transmission electron microscope (TEM) at a magnification of 10,000, measurements may be performed and may also be confirmed through Energy Dispersive X-ray Spectrometer. In this case, it can be confirmed whether a microstructure identified as the ceramic wire 141 in addition to dielectric crystal grains is detected in the cross section. Other methods and/or tools appreciated by one of ordinary skill in the art, even if not described in the present disclosure, may also be used.

The number of ceramic wires arranged in any one of the directions and the total number of ceramic wires may be obtained by analyzing the images from SEM or TEM with an image processing software. Other methods and/or tools appreciated by one of ordinary skill in the art, even if not described in the present disclosure, may also be used.

On the other hand, referring to FIGS. 7 and 8, in another embodiment of the present disclosure, the cover portions 112 and 113 may include outer cover portions 112b and 113b, and inner cover portions 112a and 113a disposed between the active portion Ac and the outer cover portion 112b and 113b, and the ceramic wire 141 may be selectively included in the inner cover portions 112a and 113a or the outer cover portions 112b and 113b.

In detail, the cover portions 112 and 113 include inner cover portions 112a and 113a disposed on the active portion Ac and outer cover portions 112b and 113b disposed on the inner cover portions 112a and 113a, and the ceramic wire 141 may be selectively included in the inner cover portions 112a and 113a or the outer cover portions 112b and 113b.

In detail, the cover portions 112 and 113 may include a double layer structure including the inner cover portions 112a and 113a and the outer cover portions 112b and 113b, and the ceramic wire 141 may be selectively included in the inner cover portions 112a and 113a or the outer cover portions 112b and 113b.

In this case, the area of the cover portion including the ceramic wire 141 and the area of the cover portion not including the ceramic wire 141 may be divided into the inner cover portions 112a and 113a or the outer cover portions 112b and 113b. For example, when the ceramic wire 141 is included in the outer cover portions 112b and 113b, the ceramic wire 141 may not be included in the inner cover portions 112a and 113a.

A method of forming the outer cover portions 112b and 113b is not particularly limited. The outer surfaces of the inner cover portions 112a and 113a may be dipped in a paste containing the ceramic wire 141, and a sheet including the ceramic wire 141 may be mounted on a film that may be easily contracted and expanded using a doctor blade method or the like, and may then be formed on the inner cover portions 112a and 113a by using a screen printing method or the like. Alternatively, the outer cover portions 112b and 113b and outer margin portions 114b and 115b may be continuously formed, for example, the second surface 2, the sixth surface 6, the first surface 1 and the fifth surface may be sequentially formed using a screen printing method or the like.

On the other hand, it may be preferable that the ceramic wire 141 is included in the outer cover portions 112b and 113b.

This is because when bending stress is applied to the cover portions 112 and 113 in the first direction due to the electrostriction effect or an external impact is applied to the cover portions 112 and 113, as greater stress is applied to the outer cover portions 112b and 113b, which are the outer regions of the cover portions 112 and 113, the degree of bending is relatively strong, and cracks or delamination may thus occur more easily. Therefore, to prevent this, the ceramic wire 141 may be included in the outer cover portions 112b and 113b.

However, the present disclosure is not limited thereto, and in the upper cover portion 112, the ceramic wire 141 may be included in the outer cover portion 112b, and in the lower cover portion 113, the ceramic wire 141 may be included in the inner cover portion 113a. Alternatively, in the upper cover portion 112, the inner cover portion 112a may include the ceramic wire 141, and in the lower cover portion 113, the outer cover portion 113b may include the ceramic wire 141.

The thickness tc of the cover portions 112 and 113 does not need to be particularly limited.

However, to more easily obtain miniaturization and high capacity of the multilayer electronic component 100, the thickness tc of the cover portions 112 and 113 may be 100 μm or less, in detail, 30 μm or less, and in micro-miniature products, in detail, may be 20 μm or less.

In this case, the thickness tc of the cover portions 112 and 113 may indicate the size of the cover portions 112 and 113 in the first direction. In addition, the thickness tc of the cover portions 112 and 113 may indicate the average thickness tc of the cover portions 112 and 113, and may indicate the average size of the cover portions 112 and 113 in the first direction.

The average size of the cover portions 112 and 113 in the first direction may be measured by scanning the image of a cross-section of the body 110 in the first and third directions with a scanning electron microscope (SEM) at a magnification of 10,000. In detail, an average value obtained by measuring the thickness at 30 equally spaced points of one cover portion 112 or 113 in the third direction in the scanned image may be measured. The 30 equally spaced points may be designated on the upper cover portion 112. In addition, if the average value is measured by extending this average value measurement to the lower cover portion 113, the average size of the cover portions 112 and 113 in the first direction may be further generalized. Other methods and/or tools appreciated by one of ordinary skill in the art, even if not described in the present disclosure, may also be used.

A multilayer electronic component 100 according to another embodiment includes a body 110 including a dielectric layer 111 and internal electrodes 121 and 122 stacked in a first direction with the dielectric layer 111 interposed therebetween, and external electrodes 131 and 132 disposed on the body 110 in a second direction perpendicular to the first direction and connected to the internal electrodes 121 and 122. The body 110 includes an active portion Ac including the internal electrodes 121 and 122 to form capacitance, and margin portions 114 and 115 disposed on both end surfaces of the active portion Ac in a third direction perpendicular to the first and second directions. The margin portions 114 and 115 include a ceramic wire 142, and the ceramic wire 142 may include at least one group arranged in one direction.

The body 110 may include the margin portions 114 and 115 disposed on both end-surfaces of the active portion Ac in the third direction.

In detail, the margin portions 114 and 115 may include a first margin portion 114 disposed on the fifth surface 5 of the active portion Ac, and a second margin portion 115 disposed on the sixth surface 6 of the active portion Ac. For example, the margin portions 114 and 115 may be disposed on both end surfaces of the active portion Ac in the third direction.

As illustrated, the margin portions 114 and 115 may refer to a region between both end surfaces of the first and second internal electrodes 121 and 122 in the third direction and the boundary surface of the body 110, based on the cross-section of the active portion Ac in the first and third directions.

The margin portions 114 and 115 may also be formed by forming the internal electrodes 121 and 122 by applying a conductive paste on the ceramic green sheet except where the margin portions 114 and 115 are to be formed, performing the cutting so that the internal electrodes 121 and 122 after stacking are exposed to the fifth and sixth surfaces 5 and 6 of the active portion Ac to suppress the step difference caused by the internal electrodes 121 and 122, and laminating a single dielectric layer 111 or two or more dielectric layers 111 on both end-surfaces of the active portion Ac in the third direction.

The margin portions 114 and 115 may basically serve to prevent damage to the internal electrodes 121 and 122 due to physical or chemical stress.

The first margin portion 114 and the second margin portion 115 may not include the internal electrodes 121 and 122 and may include the same material as the dielectric layer 111. For example, the first margin portion 114 and the second margin portion 115 may include a ceramic material, for example, a barium titanate ($BaTiO_3$)-based ceramic material.

In an embodiment, the margin portions 114 and 115 may include a ceramic wire 142.

The ceramic wires 142 included in the margin portions 114 and 115 may be the same as the ceramic wires 141 included in the aforementioned cover portions 112 and 113, and overlapping descriptions in this regard will be omitted.

The ceramic wire 142 included in the margin portions 114 and 115 may mean a ceramic material having a wire shape, and for example, the ceramic material may include at least one selected from SiC, TiC, $TiO_2$, $BaTiO_3$, ZnO, $Al_2O_3$, and glass fiber, but the present disclosure is not limited thereto.

In an embodiment, the ceramic wire 142 may include at least one of ceramic microwires and ceramic nanowires.

In an embodiment, the ceramic wires 142 included in the margin portions 114 and 115 may include at least one group arranged in one direction, and therefore, mechanical properties may be further improved.

Although the arrangement direction of the ceramic wires 142 distributed in the margin portions 114 and 115 may be randomized to improve mechanical properties, when the arrangement direction of the ceramic wires 142 is in a specific direction, possible defects that may occur in a specific direction may be more effectively suppressed.

For example, the case of the plurality of ceramic wires 142 includes, for example, a case in which the plurality of ceramic wires 141 are uniformly arranged in one direction, a case including one group arranged in one direction and the other group arranged in another direction, or a case in which a plurality of groups in which the arrangement direction is not the same may be included.

On the other hand, as a method of arranging the ceramic wires 142, a doctor blade method or the like may be used, but the present disclosure is not particularly limited thereto. A detailed description related thereto will be omitted since it is the same as the method of arranging the ceramic wires 141 included in the cover portions 112 and 113.

In an embodiment, the ceramic wires 142 may include one group arranged in one direction and another group arranged in another direction.

Referring to FIGS. 6A to 6C, which are embodiments, the ceramic wires 142 included in the margin portions 114 and 115 may be arranged in a first direction or a second direction.

For example, one group arranged in one direction may be arranged in a first direction, and another group arranged in another direction may be arranged in a second direction.

The electrostrictive effect caused by voltage application may generally occur in the first direction of the internal electrodes 121 and 122, and at this time, bending stress may be applied to the margin portions 114 and 115 in the third direction. In this case, when the ceramic wires 142 included in the margin portions 114 and 115 are arranged in the first direction or the second direction perpendicular to the third direction, bending stress applied to the margin portions 114 and 115 due to the electric distortion effect may be effectively suppressed, and occurrence of cracks, delamination, or acoustic noise may be prevented.

In detail, when the ceramic wires 142 are arranged in the first direction, bending stress in the third direction may be suppressed, and when the multilayer electronic component 100 is stretched or contracted in the first direction, mechanical characteristics may be enhanced.

When the ceramic wires 142 are arranged in the second direction, bending stress in the third direction may be suppressed, and when the multilayer electronic component 100 is stretched or contracted in the second direction, mechanical properties may be reinforced.

In the case of the ceramic wire 142 included in the margin portions 114 and 115, the measurement may be performed by scanning an image of the cross-section of the body 110 in the first and third directions with a scanning electron microscope (SEM) or a transmission electron microscope (TEM) at a magnification of 10,000, and may also be confirmed through Energy Dispersive X-ray Spectrometer. At this time, it can be confirmed whether a microstructure identified as the ceramic wire 142 in addition to dielectric crystal grains is detected in the cross section. Other methods and/or tools appreciated by one of ordinary skill in the art, even if not described in the present disclosure, may also be used.

On the other hand, referring to FIG. 8, in another embodiment of the present disclosure, the margin portions 114 and 115 include outer margin portions 114*b* and 115*b*, and inner margin portions 114*a* and 115*a* disposed between the active portion Ac and the outer margin portions 114*b* and 115*b*, while the ceramic wire 142 may be selectively included in the inner margin portions 114*a* and 115*a* or the outer margin portions 114*b* and 115*b*.

In detail, the margin portions 114 and 115 may include the inner margin portions 114*a* and 115*a* disposed on the active portion Ac and the outer margin portions 114*b* and 115*b* disposed on the inner margin portions 114*a* and 115*a*, and the ceramic wire 142 may be selectively included in the inner margin portions 114*a* and 115*a* or the outer margin portions 114*b* and 115*b*.

In detail, the margin portions 114 and 115 may include a double layer structure including the inner margin portions 114*a* and 115*a* and the outer margin portions 114*b* and 115*b*, and the ceramic wire 142 may be included in one selected from the inner margin portions 114*a* and 115*a* and the outer margin portions 114*b* and 115*b*.

In this case, an area of the margin portion including the ceramic wire 142 and an area of the margin portion not including the same may be divided into the inner margin portions 114*a* and 115*a* or the outer margin portions 114*b* and 115*b*. For example, when the ceramic wire 142 is included in the outer margin portions 114*b* and 115*b*, the ceramic wire 142 may not be included in the inner margin portions 114*a* and 115*a*.

Since the method of forming the outer margin portions 114*b* and 115*b* is the same as the method of forming the outer cover portions 112*b* and 113*b*, the descriptions thereof will be omitted.

On the other hand, it may be preferable that the ceramic wire 142 is included in the outer margin portions 114*b* and 115*b*.

This is because when bending stress is applied to the margin portions 114 and 115 in the third direction due to the electrostriction effect or an external impact is applied to the margin portions 114 and 115, as greater stress is applied to the outer margin portions 114*b* and 115*b*, which are outer regions of the margin portions 114 and 115, the degree of bending is strong, and therefore, cracks or delamination may occur more easily. Therefore, to prevent the same, the ceramic wire 142 may be included in the outer margin portions 114*b* and 115*b*.

However, the present disclosure is not limited thereto, and in the first margin portion 114, the outer margin portion 114*b* may include the ceramic wire 142, and in the second margin portion 115, the inner margin portion 115*a* may include the ceramic wire 142. Alternatively, in the first margin portion 114, the inner margin portion 114*a* may include the ceramic wire 142, and in the second margin portion 115, the outer margin portion 115*b* may include the ceramic wire 142.

The width wm of the margin portions 114 and 115 does not need to be particularly limited.

However, to more easily obtain miniaturization and high capacitance of the multilayer electronic component 100, the width (wm) of the margin portions 114 and 115 may be 100 μm or less, in detail, 30 μm or less, and in micro-miniature products, in more detail, may be 20 μm or less.

In this case, the width wm of the margin portions 114 and 115 may indicate the size of the margin portions 114 and 115 in the third direction. Further, the width wm of the margin portions 114 and 115 may indicate the average width wm of the margin portions 114 and 115, and may indicate the average size of the margin portions 114 and 115 in the third direction.

The average size of the margin portions 114 and 115 in the third direction may be measured by scanning an image of a cross-section of the body 110 in the first and third directions with a scanning electron microscope (SEM) at a magnification of 10,000, and in detail, may be an average value obtained by measuring the size of one margin portion 114 or 115 in the third direction at 30 equally spaced points in the first direction in the scanned image. The 30 equally spaced points may be designated in the first margin portion 114. In addition, if the average value is measured by extending the average value measurement to the second margin portion 115, the average size of the margin portions 114 and 115 in the third direction may be further generalized. Other methods and/or tools appreciated by one of ordinary skill in the art, even if not described in the present disclosure, may also be used.

Although a structure in which the multilayer electronic component 100 includes two external electrodes 131 and 132 is described in an embodiment, the number or shape of the external electrodes 131 and 132 may be changed according to the shape of the internal electrodes 121 and 122 or other uses.

The external electrodes 131 and 132 may be disposed on the body 110 and connected to the internal electrodes 121 and 122.

In detail, the external electrodes 131 and 132 may include first and second external electrodes 131 and 132 disposed on the third and fourth surfaces 3 and 4 of the body 110, respectively, and connected to the first and second internal electrodes 121 and 122, respectively. For example, the first external electrode 131 may be disposed on the third surface 3 of the body and connected to the first internal electrode 121, and the second external electrode 132 may be disposed on the fourth surface 4 of the body and connected to the second internal electrode 122.

On the other hand, the external electrodes 131 and 132 may be formed of any material as long as electrical conductivity may be obtained therefrom, such as a metal or the like, and a specific material may be determined in consideration of electrical characteristics, structural stability, and the like, and may further have a multilayer structure.

For example, the external electrodes 131 and 132 may include an electrode layer disposed on the body 110 and a plating layer disposed on the electrode layer.

As a more detailed example of the electrode layer, the electrode layer may be a fired electrode containing a conductive metal and glass or a resin-based electrode containing a conductive metal and resin.

In detail, electrode layers 131*a*, 132*a*, 131*b*, and 132*b* may include first electrode layers 131*a* and 132*a* disposed on the body 110 and including a first conductive metal and glass, and second electrode layers 131*b* and 132*b* disposed on the first electrode layers 131*a* and 132*a* and including a second conductive metal and a resin. In this case, the first electrode layers 131*a* and 132*a* may be fired electrodes, and the second electrode layers 131*b* and 132*b* may be resin-based electrodes.

Also, the electrode layer may be formed by transferring a sheet containing a conductive metal onto the body or by transferring a sheet containing a conductive metal onto a fired electrode.

A material having excellent electrical conductivity may be used as the first and second conductive metals included in the electrode layers 131*a*, 132*a*, 131*b*, and 132*b*. For example, the conductive metal may include at least one selected from the group consisting of nickel (Ni), copper (Cu), palladium (Pd), silver (Ag), gold (Au), platinum (Pt), tin (Sn), tungsten (W), titanium (Ti), and alloys thereof, but particularly not limited thereto.

The first electrode layers 131*a* and 132*a* contain glass to improve adhesion with the body 110, and the second electrode layers 131*b* and 132*b* contain resin to improve bending strength.

The first conductive metal used in the first electrode layers 131*a* and 132*a* is not particularly limited as long as it is a material that may be electrically connected to the internal electrodes 121 and 122 for capacitance formation, and for example, may include at least one selected from the group consisting of nickel (Ni), copper (Cu), palladium (Pd), silver (Ag), gold (Au), platinum (Pt), tin (Sn), tungsten (W), titanium (Ti), and alloys thereof. The first electrode layers 131*a* and 132*a* may be formed by applying a conductive paste prepared by adding glass frit to the conductive metal powder and then firing the same.

The second conductive metal included in the second electrode layers 131*b* and 132*b* may serve to be electrically connected to the first electrode layers 131*a* and 132*a*.

The conductive metal included in the second electrode layers 131*b* and 132*b* is not particularly limited as long as it is a material that may be electrically connected to the electrode layers 131*a* and 132*a*, and may include at least one selected from the group consisting of nickel (Ni), copper (Cu), palladium (Pd), silver (Ag), gold (Au), platinum (Pt), tin (Sn), tungsten (W), titanium (Ti), and alloys thereof.

The second conductive metal included in the second electrode layers 131*b* and 132*b* may include at least one of spherical particles and flake particles. For example, the conductive metal may consist of only flake-type particles, or only spherical particles, or may be a mixture of flake-type particles and spherical particles. In this case, the spherical particle may include a shape that is not perfectly spherical, and may include a shape in which, for example, a length ratio of a major axis to a minor axis (long axis/short axis) is 1.45 or less. The flake-type particles mean particles having a flat and elongated shape, and are not particularly limited, but, for example, a length ratio of a major axis to a minor axis (long axis/short axis) may be 1.95 or more. The lengths of the major and minor axes of the spherical particles and the flake-shaped particles may be measured from the image obtained by scanning a cross section in the first and second directions, cut at the center of the ceramic electronic component in the third direction with a scanning electron microscope (SEM). Other methods and/or tools appreciated by one of ordinary skill in the art, even if not described in the present disclosure, may also be used.

The resin included in the second electrode layers 131*b* and 132*b* serves to secure bonding and absorb shock. The resin included in the second electrode layers 131*b* and 132*b* is not particularly limited as long as it has bondability and shock absorption and may be mixed with conductive metal powder to form a paste, and may include, for example, an epoxy resin.

In addition, the second electrode layers 131*b* and 132*b* may include a plurality of metal particles, an intermetallic compound, and a resin. As the intermetallic compound is included, electrical connectivity with the first electrode layers 131*a* and 132*a* may be further improved. The intermetallic compound serves to improve electrical connectivity by connecting a plurality of metal particles, and may serve to surround and connect a plurality of metal particles to each other.

In this case, the intermetallic compound may include a metal having a melting point lower than the curing temperature of the resin. For example, since the intermetallic compound includes a metal having a melting point lower than the curing temperature of the resin, the metal having a melting point lower than the curing temperature of the resin is melted during the drying and curing process, and enclose the metal particles by forming an intermetallic compound with a portion of the metal particles. In this case, the intermetallic compound may include a metal having, in detail, a low melting point of 300° C. or less.

For example, Sn having a melting point of 113 to 220° C. may be included. During the drying and curing process, Sn is melted, and the molten Sn wets high-melting-point metal particles such as Ag, Ni, or Cu by a capillary phenomenon, and reacts with some of the Ag, Ni, or Cu metal particles to form an intermetallic compound such as $Ag_3Sn$, $Ni_3Sn_4$, $Cu_6Sn_5$, $Cu_3Sn$, or the like. Ag, Ni, or Cu that did not participate in the reaction remains in the form of metal particles.

Accordingly, the plurality of metal particles may include at least one of Ag, Ni, and Cu, and the intermetallic compound may include at least one of $Ag_3Sn$, $Ni_3Sn_4$, $Cu_6Sn_5$ and $Cu_3Sn$.

The plating layers 131*c* and 132*c* serve to improve mounting characteristics.

The type of the plating layers 131*c* and 132*c* is not particularly limited, and may be formed of a single layer of plating layer 131*c* or 132*c* containing at least one of nickel (Ni), tin (Sn), palladium (Pd), and alloys thereof, and may be formed of a plurality of layers.

For a more detailed example of the plating layers 131*c* and 132*c*, the plating layers 131*c* and 132*c* may be a Ni plating layer or a Sn plating layer, and may have a form in which a Ni plating layer and a Sn plating layer are sequentially formed on the electrode layer, and may have a form in which a Sn plating layer, a Ni plating layer and a Sn plating layer are sequentially formed. In addition, the plating layers 131*c* and 132*c* may also include a plurality of Ni plating layers and/or a plurality of Sn plating layers.

The size of the multilayer electronic component 100 does not need to be particularly limited.

As set forth above, according to an embodiment, the reliability of the multilayer electronic component is not deteriorated even in the case of bending stress and external impact.

Occurrence of cracks or delamination may be suppressed.

Mechanical properties of multilayer electronic components may be improved.

Although the embodiments of the present disclosure have been described in detail above, the present disclosure is not limited by the above-described embodiments and the accompanying drawings, but is intended to be limited by the appended claims. Therefore, various forms of substitution, modification, and change will be possible by those skilled in the art within the scope of the technical spirit of the present disclosure described in the claims, which also falls within the scope of the present disclosure.

In addition, the expression 'an embodiment' does not indicate the same embodiment, and is provided to emphasize and describe different unique characteristics. However, an embodiment presented above is not excluded from being implemented in combination with features of another embodiment. For example, even if a matter described in one detailed embodiment is not described in another embodiment, and it can be understood as a description related to another embodiment, unless there is a description contradicting or contradicting the matter in another embodiment.

Terms used in this disclosure are only used to describe an embodiment, and are not intended to limit the disclosure. In this case, singular expressions include plural expressions unless the context clearly indicates otherwise.

While embodiments have been illustrated and described above, it will be apparent to those skilled in the art that modifications and variations could be made without departing from the scope of the present disclosure as defined by the appended claims.

What is claimed is:

1. A multilayer electronic component comprising:
a body including a dielectric layer and internal electrodes stacked in a first direction with the dielectric layer interposed therebetween; and
an external electrode disposed on the body in a second direction perpendicular to the first direction and connected to the internal electrodes,
wherein the body includes:
an active portion including the internal electrodes to form capacitance, and
cover portions disposed on both end surfaces of the active portion in the first direction,
at least one of the cover portions comprises a dielectric layer and ceramic wires dispersed therewithin, wherein the ceramic wires include at least one group of the ceramic wires arranged in one direction, and
the dielectric layer between the internal electrodes is free of the ceramic wires.

2. The multilayer electronic component of claim 1, wherein the ceramic wires include at least one selected from SiC, TiC, $TiO_2$, $BaTiO_3$, ZnO, $Al_2O_3$, and fiberglass.

3. The multilayer electronic component of claim 1, wherein the ceramic wires include at least one of ceramic microwires and ceramic nanowires.

4. The multilayer electronic component of claim 1, wherein in the at least one group of ceramic wires arranged in the one direction, a number of the ceramic wires arranged in the one direction is 30% or more of a total number of the ceramic wires.

5. The multilayer electronic component of claim 1, wherein the ceramic wires further include another group of ceramic wires arranged in another direction.

6. The multilayer electronic component of claim 5, wherein the one direction is the second direction, and the another direction is a third direction.

7. The multilayer electronic component of claim 1, wherein at least one of the cover portions include an outer cover portion and an inner cover portion disposed between the active portion and the outer cover portion,
wherein the ceramic wires are selectively included in the inner cover portion or the outer cover portion.

8. The multilayer electronic component of claim 1, wherein the body further includes a margin portion disposed on both end surfaces of the active portion in a third direction perpendicular to the first and second directions,
wherein the margin portion includes the ceramic wires.

9. The multilayer electronic component of claim 1, wherein the external electrode includes:
a first electrode layer including a first conductive metal and glass and
a second electrode layer disposed on the first electrode layer and including a second conductive metal and a resin.

10. A multilayer electronic component comprising:
a body including a dielectric layer and internal electrodes stacked in a first direction with the dielectric layer interposed therebetween; and
an external electrode disposed on the body in a second direction perpendicular to the first direction and connected to the internal electrodes,
wherein the body includes:
an active portion including the internal electrodes to form capacitance and
a margin portion disposed on both end surfaces of the active portion in a third direction perpendicular to the first and second directions,
the margin portion comprises a dielectric layer and ceramic wires dispersed therewithin,
the ceramic wires include at least one group of the ceramic wires arranged in one direction, and
the dielectric layer between the internal electrodes is free of the ceramic wires.

11. The multilayer electronic component of claim 10, wherein the ceramic wire includes at least one of SiC, TiC, $TiO_2$, $BaTiO_3$, ZnO, $Al_2O_3$, and fiberglass.

12. The multilayer electronic component of claim 10, wherein the ceramic wires include at least one of ceramic microwires and ceramic nanowires.

13. The multilayer electronic component of claim 10, wherein in the at least one group of ceramic wires arranged in the one direction, a number of the ceramic wires arranged in the one direction is 30% or more compared to a total number of the ceramic wires.

14. The multilayer electronic component of claim 10, wherein the ceramic wires further include another group of ceramic wires arranged in another direction.

15. The multilayer electronic component of claim 14, wherein the one direction is the first direction, and the another direction is the second direction.

16. The multilayer electronic component of claim 10, wherein the margin portion includes an outer margin portion and an inner margin portion disposed between the active portion and the outer margin portion,
wherein the ceramic wires are selectively included in the inner margin portion or the outer margin portion.

17. The multilayer electronic component of claim 10, wherein the external electrode includes:
a first electrode layer disposed on the body and including a first conductive metal and glass, and
a second electrode layer disposed on the first electrode layer and including a second conductive metal and a resin.

18. A multilayer electronic component comprising:
a body including a dielectric layer and internal electrodes stacked in a first direction with the dielectric layer interposed therebetween; and
an external electrode disposed on the body in a second direction perpendicular to the first direction and connected to the internal electrodes,
wherein the body includes:
an active portion including the internal electrodes to form capacitance and
a margin portion disposed on both end surfaces of the active portion in a third direction perpendicular to the first and second directions,
the margin portion comprises a dielectric layer and at least one ceramic wire dispersed therewithin, and
the dielectric layer between the internal electrodes is free of the ceramic wires.

19. The multilayer electronic component of claim 18, wherein the dielectric layer is free of ceramic wire.

20. The multilayer electronic component of claim 18, wherein the at least one ceramic wire is arranged in the first direction.

21. The multilayer electronic component of claim 18, wherein the at least one ceramic wire includes at least one selected from SiC, TiC, $TiO_2$, $BaTiO_3$, ZnO, $Al_2O_3$, and fiberglass.

22. The multilayer electronic component of claim 18, wherein the at least one ceramic wire includes at least one of ceramic microwires and ceramic nanowires.

23. The multilayer electronic component of claim 18, wherein the margin portion includes an outer margin portion and an inner margin portion disposed between the active portion and the outer margin portion, wherein the at least one ceramic wire is selectively included in the inner margin portion or the outer margin portion.

* * * * *